(12) United States Patent
Itoh

(10) Patent No.: US 7,046,791 B2
(45) Date of Patent: May 16, 2006

(54) FACSIMILE APPARATUS FOR OUTPUTTING A MELODY WHEN RECEIVING A CALL FROM A SPECIFIC PARTY

(75) Inventor: Nobuhiro Itoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 10/217,322

(22) Filed: Aug. 12, 2002

(65) Prior Publication Data

US 2003/0053144 A1 Mar. 20, 2003

(30) Foreign Application Priority Data

Aug. 24, 2001 (JP) .......................... 2001-253932

(51) Int. Cl.
*H04M 1/00* (2006.01)

(52) U.S. Cl. .............. 379/373.03; 379/373.02; 379/374.02; 379/376.01

(58) Field of Classification Search ............. 379/373.01, 379/373.02, 373.03, 373.04, 374.02, 374.03, 379/376.01, 88.01, 88.11, 93.17, 93.23, 142.01, 379/88.13, 376.02

See application file for complete search history.

(56) References Cited

U.S. PATENT DOCUMENTS

| 4,480,154 A | * | 10/1984 | Klee | 379/376.02 |
| 5,442,686 A | * | 8/1995 | Wada et al. | 379/88.13 |
| 5,907,604 A | * | 5/1999 | Hsu | 379/142.06 |
| 2002/0094076 A1 | * | 7/2002 | Chen | 379/373.01 |

FOREIGN PATENT DOCUMENTS

| JP | 11252220 | 9/1999 |
| JP | 2000358086 | * 12/2000 ............. 379/373.01 |

OTHER PUBLICATIONS

U.S. Appl. No. 10/054,147, filed Jan. 21, 2002.

* cited by examiner

*Primary Examiner*—Jefferey F. Harold
(74) *Attorney, Agent, or Firm*—Cooper & Dunham LLP

(57) ABSTRACT

A facsimile apparatus can notify a user of the fact that facsimile data being received is sent from a specific party. A communication control part receives facsimile data and party information from a remote facsimile apparatus, the party information identifying the remote facsimile apparatus. A melody output part stores and outputs a call-notification-melody so as to output the reproduced call-notification-melody through a speaker. A specific party discrimination part stores specific party information regarding a specific party for which the call-notification-melody is output. A system control part cases the melody output part to reproduce and output the call-notification-melody stored when the party information which the communication control part acquired matches the specific party information stored in the specific party discrimination part at a time of reception of a call.

18 Claims, 3 Drawing Sheets

FIG.2

* MELODY & ILLUMINATION LIST *

P. 1

THIS FUNCTION IS ON

| PARTY | WILD CARD | MELODY | ILLUMINATION | MELODY OUTPUT TIME SETTING |
|---|---|---|---|---|
| ○○○○ | ON | OFF | ON | OFF (00:00 – 00:00) |
| △△△△ | ON | ON | ON | ON (08:30 – 17:30) |
| □□□□ | ON | ON | ON | OFF (00:00 – 00:00) |

FACSIMILE APPARATUS FOR OUTPUTTING A MELODY WHEN RECEIVING A CALL FROM A SPECIFIC PARTY

BACKGROUND OF THE INVENTION

1. Field of the Invention

The present invention generally relates to facsimile apparatuses and, more particularly, to a facsimile apparatus which is capable of discriminating a remote facsimile apparatus from which a call is received.

2. Description of the Related Art

Along with popularization of facsimile apparatuses, they are used in a variety of fields and at home. A conventional facsimile apparatus, when receiving an incoming call, receives facsimile data (image data) in response to the incoming call regardless of a sending party, and outputs the received facsimile data on a record paper. At the time of reception of an incoming call, the conventional facsimile apparatus may have a function to increase a sound level of a ringing tone, a function to turn on/off the output of the call signal or adjust the sound level of the ringing tone. Accordingly, if needed, a user of the facsimile apparatus can turn on/off the ringing tone, or set the ringing tone to a small sound level at which the ringing tone is not noisy.

Additionally, Japanese Laid-Open Patent Application No. 11-252220 discloses a telephone terminal apparatus that is capable of changing the ringing tone of an incoming call or sending a message to refuse a response to an incoming call.

Thus, in the conventional facsimile apparatus and the telephone terminal disclosed in Japanese Laid-Open Patent Application No. 11-252220, a ringing tone of an incoming call can be turned on or off, or a level of the ringing tone can be changed.

However, with the conventional facsimile apparatus, receiving operations for all calls from remote terminals are fixed. For this reason, an incoming call from a specific party (specific terminal) is undistinguishable from incoming calls from other parties (other terminals). Therefore, there is a demand to improve the receiving operations so as to improve convenience of facsimile apparatuses.

SUMMARY OF THE INVENTION

It is a general object of the present invention to provide an improved and useful facsimile apparatus in which the above-mentioned problems are eliminated.

A more specific object of the present invention is to provide a facsimile apparatus which can notify a user of the fact that facsimile data being received is sent from a specific party.

In order to achieve the above-mentioned objects, there is provided according to one aspect of the present invention a facsimile apparatus comprising: facsimile communication means for receiving image data and party information from a remote apparatus according to a facsimile communication protocol, the party information identifying the remote apparatus; melody storing means for storing at least one call-notification-melody; reproducing means for reproducing the call-notification-melody stored in the melody storing means and outputting the call-notification-melody reproduced through a speaker; specific party information storing means for storing specific party information regarding at least one specific party for which the call-notification-melody is output; and control means, when the party information which the facsimile communication means acquired matches the specific party information stored in the specific party information storing means at a time of reception of a call, for causing the reproducing means to reproduce and output the call-notification-melody stored in the melody storing means.

According to the present invention, even when the facsimile apparatus does not join a number display system, a user can recognize a party who is sending facsimile data (image data) prior to reviewing the contents of the facsimile data. Thus, the user can positively obtain at his/her hand materials sent from a specific party of urgency, which improves convenience of the facsimile apparatus 1.

In the facsimile apparatus according to the present invention, the melody storing means may store a plurality of call-notification-melodies; the specific party information storing means may store the party information regarding a plurality of specific parties and the call-notification-melody information which indicates one of the plurality of call-notification-melodies stored in the melody storing means; and when the party information which the facsimile communication means acquired matches the specific party information stored in the specific party information storing means, the control means may cause the reproducing means to reproduce the call-notification-melody corresponding to the party information acquired by the facsimile communication means.

Accordingly, when a user is remote from the facsimile apparatus or a plurality of users share the facsimile apparatus, each user can positively determine one of the specific partners from a difference in the call-notification-melodies. Thus, each user can immediately obtain necessary information, which achieves a smooth communication of information and further improves the convenience of facsimile apparatus.

Additionally, the facsimile apparatus according to the present invention may further comprise: light-emitting means for emitting a light in a plurality of colors; and illumination control means for controlling the color and light-emitting timing of the light-emitting means by storing light-emitting patterns indicating the color and light-emitting timing of the light-emitting means, wherein: the specific party information storing means stores the specific party information regarding a plurality of specific parties and illumination information indicating one of the light emitting patterns stored in the illumination control means; and when the party information which the facsimile communication means acquired matches the specific party information stored in the specific party information storing means, the control means causes the illumination control means to turn on the light-emitting means according to the light-emitting pattern indicated by the illumination information corresponding to the party information acquired by the facsimile communication means.

Accordingly, even in a case where it is difficult to hear the melody sound due to office noise and the like, the reception of a call from a specific party can be easily recognized visually. Accordingly, there is less possibility of a problem in that a user mistakenly brings materials for other users, which improves the convenience of the facsimile apparatus.

Further, the facsimile apparatus according to the present invention may further comprise: volume adjusting means for adjusting an output volume of the call-notification-melody by the reproducing means; and volume time storing means for storing the output volume of the call-notification-melody for each time zone, wherein the control means causes the volume adjusting means to adjust the output volume of the call-notification-melody output by the reproducing means to the output volume specified for each time zone.

Accordingly, the output of the melody may be prohibited at midnight where it is quiet, and a user can recognize reception of a call from a specific party by luminescence of the light-emitting means such as a light-emitting diode. Thus, the user can positively identify the sending party, which further improves the convenience of the facsimile apparatus.

According to an embodiment of the present invention, a facsimile apparatus may comprise: a communication control part which receives facsimile data and party information from a remote facsimile apparatus according to a facsimile communication protocol, the party information identifying the remote facsimile apparatus; a melody output part which stores at least one call-notification-melody and reproduces the call-notification-melody so as to output the reproduced call-notification-melody through a speaker; a specific party discrimination part which stores specific party information regarding at least one specific party for which the call-notification-melody is output; and a system control part which cases the melody output part to reproduce and output the call-notification-melody stored when the party information which the communication control part acquired matches the specific party information stored in the specific party discrimination part at a time of reception of a call.

In the embodiment, the melody output part may store a plurality of kinds of call-notification-melodies; and the specific party discrimination part may store the party information regarding a plurality of specific parties and call-notification-melody information which indicates one of the plurality of call-notification-melodies stored in the melody output part, and wherein, when the party information which the communication control part acquired matches the party information stored in the specific party discrimination part, the system control part may cause the melody output part to reproduce the call-notification-melody corresponding to the party information received by the communication control part.

Additionally, the facsimile apparatus according to the embodiment may further comprise an LED control part which stores information regarding a plurality of light-emitting patterns of a lighting color and light-emitting timing of a light-emitting element which emits a light in a plurality of colors so as to control the lighting color and the light-emitting timing of the light-emitting element, and wherein the specific party discrimination part stores the party information regarding a plurality of specific parties and illumination information which indicates one of the light-emitting patterns stored in the LED control part, the party information being related to the illumination information, wherein, when the party information which the communication control part acquired is stored in the specific party discrimination part, the LED control part causes the light-emitting element to emit a light according to one of the light-emitting patterns corresponding to the party information acquired by the communication control part.

Further, the facsimile apparatus according to the embodiment may further comprise a silent-call-reception control part which adjusts, at a timing of outputting the call-notification-melody, the output volume level of the melody output part to an output volume level corresponding to a time zone of the call-notification-melody output from among time zones stored in the silent-call-reception control part.

Other objects, features and advantages of the present invention will become more apparent from the following detailed description when read in conjunction with the accompanying drawings.

BRIEF DESCRIPTION OF THE DRAWINGS

FIG. 2 is an illustration of a screen which displays a control list of call-notification-melodies and illumination of an LED provided on an operation display part.

DETAILED DESCRIPTION OF THE PREFERRED EMBODIMENTS

Figure 1:
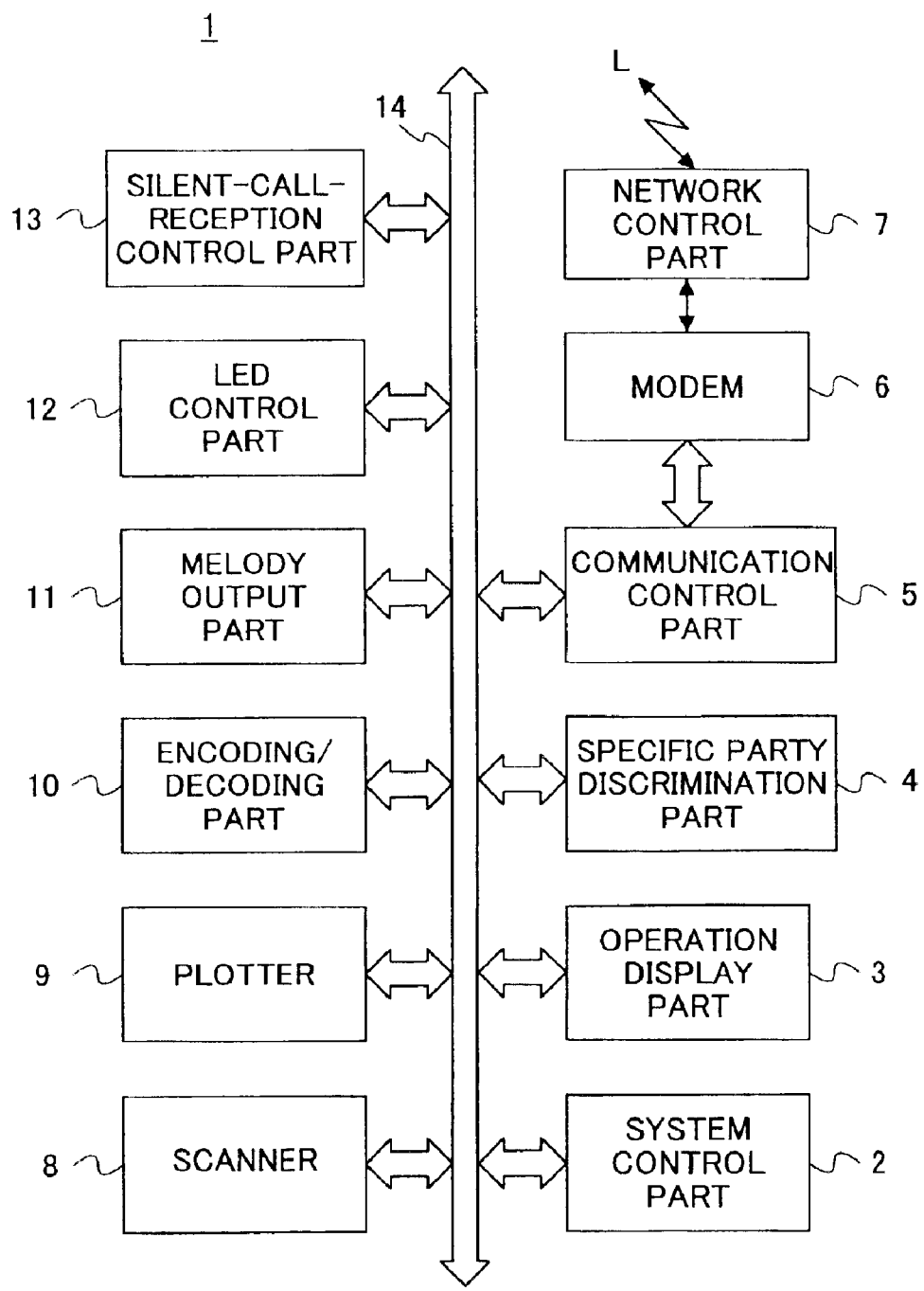
FIG. 1 is a block diagram of a facsimile apparatus according to an embodiment of the present invention.

A description will now be given of a first embodiment of the present invention. FIG. 1 is a block diagram of a facsimile apparatus 1 according to the first embodiment of the present invention.

The facsimile apparatus 1 shown in FIG. 1 comprises a system control part 2, an operation display part 3, a specific party discrimination part 4, a communication control part 5, a modem 6, a network control part 7, a scanner 8, a plotter 9, an encoding/decoding part 10, a melody output part 11, an LED control part 12, and a silent call reception control part 13. The aforementioned parts are connected to each other through a bus 14.

The system control part (control means) 2 comprises a central processing unit (CPU), a read only memory (ROM), a random access memory (RAM), etc. The ROM stores various programs, such as a basic process program of the facsimile apparatus 1 and an incoming call notification control process program mentioned later. Additionally, the ROM stores system data and various kinds of data necessary for executing various programs including the basic process program and the incoming call notification control process program.

The system control part 2 controls each part of the facsimile apparatus 1 according to programs stored in the ROM while using the RAM as a work memory. Additionally, the system control part 2 performs a basic process as the facsimile apparatus 1 and an incoming call notification control process mentioned later.

The operation display part 2 comprises various operation keys such as ten keys and function keys. Various commands such as transmitting operation commands are input through the operation keys. Additionally, the operation display part 2 comprises a display (for example, a liquid crystal display). The display can indicate contents of commands input through the operation keys and various kinds of information which are to be notified from the facsimile apparatus 1 to an operator. Especially, various setting operations can be performed through the operation display part 2, such as setting of melody notifying an incoming call or setting of on/off of the melody notifying an incoming call. Hereinafter, the melody notifying an incoming call, which is used instead of a ringing sound, is referred to as "call notification melody".

Additionally, the operation display part 2 is provided with a light emitting diode (LED) as a light emitting element which blinks with a plurality of colors in at least the incoming call notification control process. Lighting/blinking in a plurality of colors and luminescence timing are controlled by the LED control part 12 as mentioned later.

The specific party discrimination part 4 (specific party information storing means) is provided with an internal memory in which a designation of a specific party and discrimination information for discriminating the specific party are registered. In the present embodiment, in order to discriminate the incoming call received from the specific party, the reception of the incoming call is notified by a specific call-notification-melody and/or lighting the LED. The party discrimination information (party information) is, for example, a receiver terminal identification (RTI) signal of a sending party, a called subscriber identification (CSI) signal, or information distinguishable by protocol signals such as a calling terminal identifier. The specific party discrimination part 4 compares the party discrimination information, which is obtained by the communication control part 5 from facsimile protocols when a call is received, with the party discrimination information registered in the internal memory, and determines whether or not the incoming call is sent from a specific party. If the incoming call is made by the specific party, the name of the specific party is acquired from the information stored in the internal memory, and the party name is sent to the system control part 2. It should be noted that the specific party name and party discrimination information are previously input by the operator of the facsimile apparatus 1 through the operation display part 2 and stored in the internal memory of the specific party discrimination part 4 according to the control of the system control part 2.

The communication control part 5 is connected to the modem 6, and the modem 6 is connected to the network control part 7. The network control part 7 is connected to a communication line L such as a public service telephone network. The network control part 7 operates under the control of the communication control part 5, and performs a process as an interface with the communication line L. That is, the network control part 7 performs an automatic call reception process with respect to a call received through the communication line L and an automatic calling process to the communication line L.

The modem 6 performs a modulation of sending signals such as protocol signals and image information and a demodulation of reception signals input through the network control part 7 in accordance with a facsimile communications standard. Additionally, the modem 6 detects dual tone mutifrequency (DTME).

The communication control part 5 performs a cadence detection control, and exchanges facsimile control signals with a remote facsimile apparatus so as to execute a facsimile communication procedure. Especially, the communication control part 5 acquires, when receiving a call, party discrimination information sent from a remote party, such as RTI, CSI or calling terminal identifier, and sends the acquired information to the specific party discrimination part 4. The communication control part 5, the modem 6 and the network control part 7 together serve as facsimile communication means as a whole.

An image scanner using a charge coupled device (CCD), etc. is used as the scanner 8, which is generally equipped with an automatic document feeder (ADF). A plurality of sheets of original document are set in the ADF so that the ADF feeds the original document to an original reading position in the scanner 8 on an individual sheet basis. The scanner 8 scans the original document fed by the ADF, and reads an image of the original document in a predetermined resolution.

A thermal recording device using a thermal element or an electrophotography recording device etc. is used for the plotter 9. The plotter 9 outputs an image of received image data or an image read by the scanner on a record paper.

The encoding/decoding part 10 is provided for achieving an efficient storage of image information in the image memory and for reducing a transmission time. The encoding/decoding part 10 encodes image information according to a predetermined encoding method, and decodes the encoded image information.

The melody output part 11 (call-notification-melody memory means, reproduction means) comprises: an internal memory in which call-notification-melody is registered for each party registered in the specific party discrimination part 4; a melody memory in which a plurality of kinds of melody are registered; and a reproduction sending part which reproduces a designated call-notification-melody from among the plurality of kinds of call-notification-melody stored in the internal memory and outputs the designated melody from a speaker. The system control part 12 registers relation information in the internal memory of the melody output part 11 when a call-notification melody is selected from among a plurality of kinds of call-notification-melody through the operation display part 3 with a designation of a party. The relation information relates the designated party name to the designated call-notification-melody stored in the melody memory.

When the specific party name is supplied from the specific party discrimination part 4, the melody output part 11 reads the call-notification-melody from the melody memory in response to the specific party name under the control of the system control part 2. The melody output part 11 reproduces the read melody by the reproduction sending part, and outputs the reproduced melody through a speaker.

The LED control part 12 is provided with an internal memory in which LED illumination data is stored. The LED illumination data is information for turning on/off or blinks the LED at an illumination color and illumination timing corresponding to the selected call-notification-melody registered in the melody output part 11. When the call-notification-melody corresponding to the specific party is specified in the melody output part 11, the LED control part 12 reads the LED illumination data stored in the internal memory in correspondence to the call-notification-melody concerned, and controls the illumination color and illumination timing of the LED provided on the operation display part 3.

The silent-call-reception control part 13 (volume control means, volume time memory means) controls sending of the call-notification-melody carried out by the melody output part 11. The silent-call-reception control part 13 controls a ringing-on control performed by a call-reception tone control part (not shown in the figure), and, especially controls a sending operation performed by the melody output part 11 independent from the silent-call-reception. For example, even when the apparatus is set in the silent-call-reception mode by the call-reception tone control part, the setting is made to send a call-notification-melody with respect to a specific party so as to output the call-notification-melody. Moreover, if an instruction to prohibit the call-notification-melody from being output is input through the operation display part 3, the silent-call-reception control part 13 prohibits the melody output part 11 from sending the call-notification-melody. Moreover, the silent-call-reception control part 13 controls whether to light or blink the LED according to the LED control part 12. Further, the silent-call-reception control part 13 can control the sending/stop of the call-notification-melody, adjustment of a tone volume and tuning on/off of the LED by designating a time zone. The control of the output of the call-notification-melody and the operation of the LED can be set with a designation of time through a key operation of the operation display part 3. The contents of the setting are registered into the internal memory of the silent-call-reception control part 13, and the silent-call-reception control part 13 performs a control according to the control list of the internal memory.

As shown in FIG. 2, the control list of the call-notification-melody and the LED by the silent-call-reception control part 13 are set up through the operation display part 3 on an individual party basis, and are registered into the internal memory. In the present embodiment, although an on/off of the call-notification-melody and the LED and an on/off of the call-notification-melody for each time zone can be set in the control list of the silent-call-reception control parts 13, the on/off of the LED may be registered with a designation of time zone.

Figure 3:
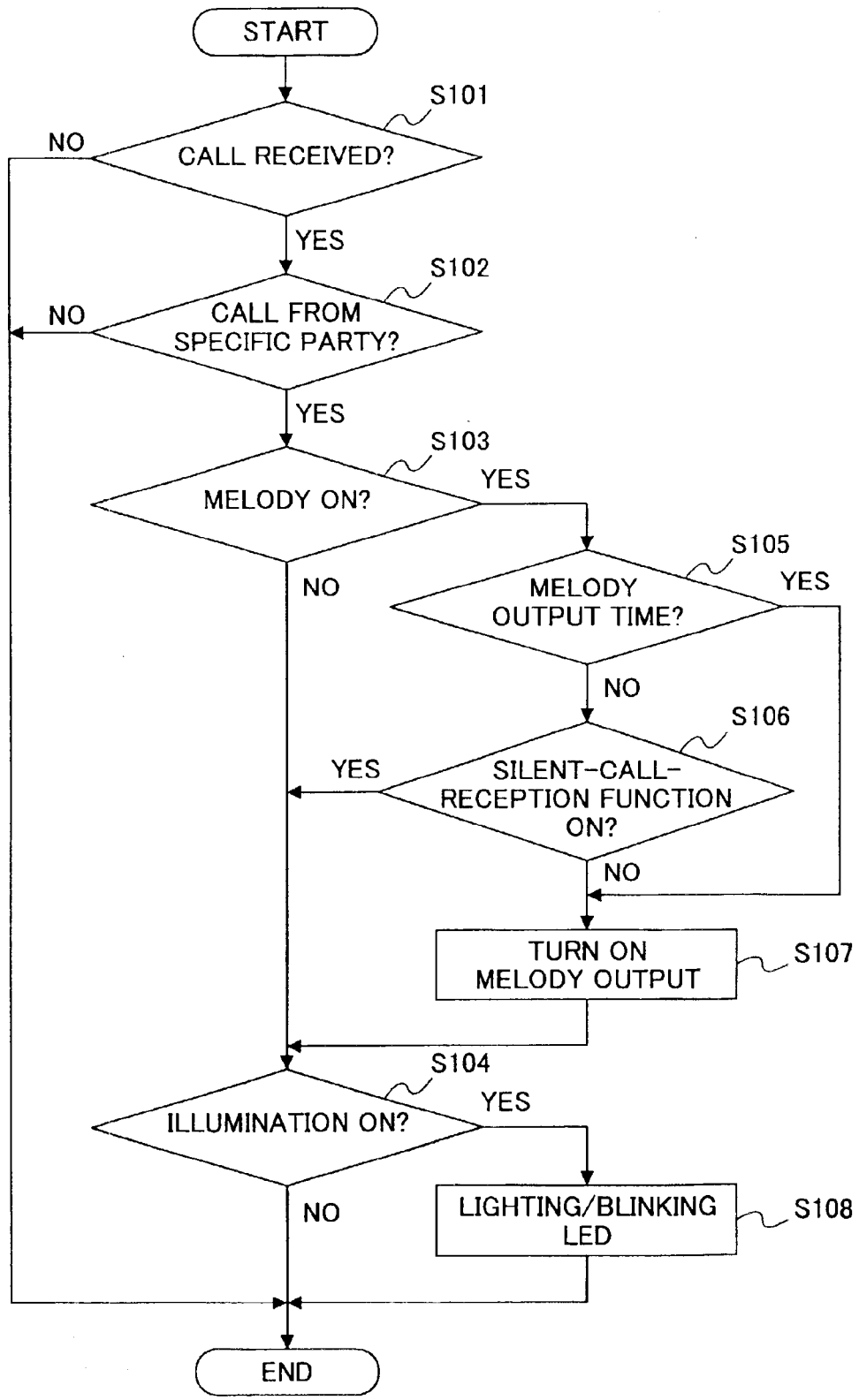
FIG. 3 is a flowchart of an operation performed by the facsimile apparatus shown in FIG. 1.

A description will now be given, with reference to FIG. 3, of an operation of the facsimile apparatus 1 shown in FIG. 1.

The facsimile apparatus 1 has a function to output call-notification-melody in response to setting on an individual specific party basis, which specific party is previously registered, and performs call-reception-notification control process so as to cause the LED to turn on or blink.

First, the system control part 2 of the facsimile apparatus 1 checks, in step S101, whether there is any incoming call received. If there is no incoming call, the system control part 2 ends the call-reception-notification control process. If there is an incoming call, the specific party discrimination part 4 determines, in step S102, whether the incoming call is sent from a specific party according to the party discrimination information obtained by the communication control part 5. If the incoming call is not sent from a specific party, the system control part 2 performs a regular call-reception process. At this time, a ringing operation is performed by a regular ringing mechanism, or a silent call-reception is performed when a silent call-reception mode is set to prohibit ringing.

If it is determined, in step S102, that the incoming call is sent from a specific party, the system control part 2 determines, in step S103, whether an output function of the call-notification-melody is turned on. If the call-notification-melody output function is off, the operation proceeds to step S104 without outputting the call-notification melody. Then, in step S104, it is determined whether an illumination function to turn on or blink the LED is turned on.

If it is determined, in step S104, that the illumination function is off, the system control part 2 performs the regular call-reception process without lighting or blinking the LED, and ends the call-reception-notification control process.

If it is determined, in step S103, that the call-notification-melody outputting function is on, the system control part 2 determines, in step S105, whether the time the incoming call is received is a call-notification-melody output time according to the control list of the silent-call-reception control part 13. If it is not the call-notification-melody output time, the system control part 2 determines, in step S106, whether the silent-call-reception function is turned on.

If the silent-call-reception function is on, the operation proceeds to step S104 so that the system control part 2 determines whether the illumination function is turned on. If the illumination function is off, the system control part 2 carries out the regular call reception process without lighting or blinking the LED, and ends the call-notification control process.

If it is determined, in step S106, the silent-call-reception function is off, the system control part 2 causes, in step S107, the melody output part 11 to output the call-notification-melody registered in the melody output part 11 corresponding to the specific party concerned. Thereafter, the operation proceeds to step S104 so that the system control part 2 determines whether the illumination function is turned on. If the illumination function is off, the system control part 2 carries out the regular call reception process without lighting or blinking the LED, and ends the call-notification control process.

If it is determined, in step S105, that it is the call-notification-melody output time, the system control part 2 causes, in step S107, the melody output part 11 to output the call-notification-melody registered in the melody output part 11 corresponding to the specific party concerned. Thereafter, the operation proceeds to step S104 so that the system control part 2 determines whether the illumination function is turned on. If the illumination function is off, the system control part 2 carries out the regular call reception process without lighting or blinking the LED, and ends the call-notification control process.

If it is determined, in step S104, that the illumination function is on, the system control part 2 causes, in step S108, the LED control part 12 to light or blink the LED, which is provided in the operation display part 3 to notify a user of reception of a call from a specific party, with a lighting color and lighting timing assigned to the specific party concerned, and, then, performs a regular call reception process.

As mentioned above, in the facsimile apparatus 1 according to the present invention, if the party information, which the communication control part 5 acquired, is stored in the specific party discrimination part 4 which stores the party information regarding the specific party for which a call-notification-melody is output at the time of reception of a call, the call-notification-melody stored in the melody output part 11 is reproduced by the melody output part 11 and the reproduced call-notification-melody is output through a speaker.

Therefore, even when the facsimile apparatus 1 does not join a number display system, a user can recognize a party who is sending facsimile data prior to reviewing the contents of the facsimile data. For this reason, the user can positively obtain at his/her hand materials sent from a specific party of urgency, which improves convenience of the facsimile apparatus 1.

Additionally, the facsimile apparatus 1 according to the present invention comprises: the melody output part 11 which stores a plurality of kinds of call-notification-melodies; and the specific party discrimination part 4 which stores the party information regarding a plurality of specific parties and the call-notification-melody information which indicates one of the plurality of call-notification-melodies stored in the melody output part 11, wherein, when the party information which the communication control part 5 acquired matches the party information stored in the specific party discrimination part 4, the melody output part 11 is caused to reproduce the call-notification-melody stored in the melody output part 11 corresponding to the party information concerned.

Therefore, when a user is remote from the facsimile apparatus 1 or a plurality of users share the facsimile apparatus 1, each user can positively determine one of the specific partners from a difference in the call-notification-melodies. Thus, each user can immediately obtain necessary information, which achieves a smooth communication of information and further improves the convenience of facsimile apparatus 1.

Further, the facsimile apparatus 1 according to the present embodiment comprises: the LED control part 12 which stores information regarding a plurality of light-emitting patterns of a lighting color and light-emitting timing of the LED which emits a light in a plurality of colors so as to control the lighting color and the lighting timing of the LED; and the specific party discrimination part 4 which stores the party information regarding a plurality of specific parties and illumination information which indicates one of the light-emitting patterns stored in the LED control part 12, the party information being related to the illumination information, wherein, when the party information which the communication control part 5 acquired is stored in the specific party discrimination part 4, the LED control part 12 causes the LED to emit a light according to one of the light-emitting patterns stored in the LED control part 12 corresponding to the party information concerned.

Therefore, even in a case where it is difficult to hear the melody sound due to office noise and the like, the reception of a call from a specific party can be easily recognized visually. Accordingly, there is less possibility of a problem in that a user mistakenly brings materials for other users, which improves the convenience of the facsimile apparatus 1.

Furthermore, the facsimile apparatus 1 according to the present invention adjusts, at a timing of outputting the call-notification-melody, the output volume level of the melody output part 11 to an output volume level corresponding to the call-notification-melody output time from among output times stored in the silent-call-reception control part 13. Accordingly, the output of the melody may be prohibited at midnight where it is quiet, and a user can recognize reception of a call from a specific party by luminescence of the LED. Thus, the user can positively identify the sending party, which further improves the convenience of the facsimile apparatus 1.

The present invention is not limited to the specifically disclosed embodiments, and variations and modifications may be made without departing from the scope of the present invention.

The present application is based on Japanese priority application No. 2001-253932 filed Aug. 24, 2002, the entire contents of which are hereby incorporated by reference.

What is claimed is:

1. A communication apparatus comprising:
   communication means for receiving party information from a network, the party information identifying a calling party;
   melody storing means for storing a plurality of call-notification-melodies;
   reproducing means for reproducing one of the call-notification-melodies stored in the melody storing means and outputting the reproduced call-notification melody through a speaker;
   specific party information storing means for storing specific party information for a plurality of specific parties, and storing for the specific parties respective call-notification-melody information, the stored call-notification-melody information for a specific party indicating one of the plurality of call-notification-melodies which corresponds to the specific party;
   display pattern storage means for storing a plurality of display patterns corresponding to the call-notification-melody information stored in said specific party information storing means for the specific parties;
   control means for, when the party information which the communication means receives matches the specific party information in the specific party information storing means corresponding to one of the specific parties, causing the reproducing means to reproduce and output the call-notification-melody corresponding to the matched specific party and causing a corresponding display pattern to be displayed; and
   an operation part, wherein the display patterns are designated on an individual party basis by a first operation through the operation part, and reproduction of a call-notification melody is turned on and off on an individual party basis by a second operation through the operation part.

2. A communication apparatus comprising:
   a receiving part configured to receive party information from a network, the party information identifying a calling party;
   a melody memory configured to store a plurality of call-notification-melodies;
   a melody output part configured to reproduce one of the call-notification-melodies stored in the melody memory and output the reproduced call-notification melody through a speaker;
   an operation part;
   a specific party discrimination part configured to store specific party information for a plurality of specific parties, and store for the specific parties respective call-notification-melody information, the stored call-notification-melody information for a specific party indicating one of the plurality of call-notification-melodies which corresponds to the specific party; and
   a control part including a storage part configured to store a plurality of display patterns corresponding to the call-notification-melody information stored in said specific party discrimination part for the specific parties,
   wherein when the party information which the receiving part receives matches the specific party information in the specific party discrimination part corresponding to one of the specific parties, said control part causes the melody output part to reproduce and output the call-notification-melody corresponding to the matched specific party, and causes a corresponding display pattern to be displayed, and
   wherein the display patterns are designated on an individual party basis by a first operation through the operation part, and reproduction of a call-notification melody is turned on and off on an individual party basis by a second operation through the operation part.

3. A communication apparatus comprising:
   a receiving part configured to receive party information from a network, the party information identifying a calling party;
   a melody memory configured to store a plurality of call-notification-melodies;
   a specific party discrimination part configured to store specific party information for a plurality of specific parties, and store for the specific parties respective call-notification-melody information, the stored call-notification-melody information for a specific party indicating one of the plurality of call-notification-melodies which corresponds to the specific party;
   a storage part configured to store a plurality of display patterns corresponding to the call-notification-melody information stored in said specific party discrimination part for the specific parties;
   an operation part, wherein the display patterns are designated on an individual party basis by a first operation through the operation part, and a sound level of the call-notification melody is set on an individual party basis by a second operation through the operation part; and a control part, wherein when the party information which the receiving part receives matches the specific party information in the specific party discrimination part corresponding to one of the specific parties, said control part causes the call-notification-melody corresponding to the matched specific party to be reproduced and output through a speaker, and causes a corresponding display pattern to be displayed.

4. A communication apparatus comprising:

communication means for receiving party information from a network, the party information identifying a calling party;

melody storing means for storing a plurality of call-notification-melodies;

specific party information storing means for storing specific party information for a plurality of specific parties, and storing for the specific parties respective call-notification-melody information, the stored call-notification-melody information for a specific party indicating one of the plurality of call-notification-melodies which corresponds to the specific party;

display pattern storage means for storing a plurality of display patterns corresponding to the call-notification-melody information stored in said specific party information storing means for the specific parties;

an operation part, wherein the display patterns are designated on an individual party basis by a first operation through the operation part, and a sound level of a call-notification melody is set on an individual party basis by a second operation through the operation part; and control means, wherein when the party information which the communication means receives matches the specific party information in the specific party information storing means corresponding to one of the specific parties, said control means causes the call-notification-melody corresponding to the matched specific party to be reproduced and output through a speaker, and causes a corresponding display pattern to be displayed.

5. A communication apparatus comprising:

a receiving part configured to receive party information from a network, the party information identifying a calling party;

a specific party discrimination part configured to store specific party information for a plurality of specific parties;

a storage part configured to store a plurality of display patterns corresponding to the specific party information stored in said specific party discrimination part for the respective specific parties; and an operation part, wherein each display pattern includes lighting color and lighting timing, and the display patterns including the lighting color and the lighting timing are designated on an individual party basis by operation through the operation part; and a control part, wherein when the party information which the receiving part receives matches the specific party information in the specific party discrimination part corresponding to one of the specific parties, said control part causes a corresponding display pattern to be output, wherein the storage part further stores information regarding a relationship between a plurality of melodies and the specific parties.

6. The communication apparatus of claim 5, wherein the melodies are assigned to the specific parties by operation through the operation part.

7. The communication apparatus of claim 5, wherein a setting list that indicates correspondence between the melodies and specific parties is displayed, by operation through the operation part.

8. The communication apparatus of claim 5, wherein said control part controls whether to output the melodies based on ON/OFF setting performed by operation through the operation part.

9. The communication apparatus of claim 5, further comprising:

volume adjusting means for adjusting an output volume of a melody through a speaker, wherein the control part causes the volume adjusting means to adjust the output volume of the melody output through the speaker.

10. The communication apparatus of claim 5, further comprising an LED control part which stores information regarding a plurality of light-emitting patterns of a lighting color and light-emitting timing of a light-emitting element which emits a light in a plurality of colors so as to control the lighting color and the light-emitting timing of the light-emitting element, wherein the specific party discrimination part stores for each of the specific parties respective illumination information, the illumination information for a specific party indicating one of the light emitting patterns stored in the LED control part, and when the party information which the receiving part received matches the specific party information stored for a matched specific party in the specific party discrimination part, the LED control part causes the light-emitting element to emit a light according to one of the light-emitting patterns corresponding to the matched specific party information.

11. The communication apparatus of claim 5, further comprising a silent-call-reception control part which adjusts, at a timing of outputting a melody, an output volume level of the output melody to an output volume level corresponding to a time zone of the communication apparatus.

12. A communication apparatus comprising:

a receiving part configured to receive party information from a network, the party information identifying a calling party;

a specific party discrimination part configured to store specific party information for a plurality of specific parties;

a storage part configured to store a plurality of display patterns corresponding to the specific party information stored in said specific party discrimination part for the respective specific parties;

an operation part, wherein the display patterns are designated on an individual party basis by a first operation through the operation part, and display of a display pattern at a time of receiving a call is turned on and off by a second operation through the operation part; and a control part, wherein when the party information which the receiving part receives matches the specific party information in the specific party discrimination part corresponding to one of the specific parties, said control part causes a corresponding display pattern to be output.

Wherein the storage part further stores information regarding a relationship between a plurality of melodies and the specific parties.

13. The communication apparatus of claim 12, wherein the melodies are assigned to the specific parties by operation through the operation part.

14. The communication apparatus of claim 12, wherein a setting list that indicates correspondence between the melodies and specific parties is displayed, by operation through the operation part.

15. The communication apparatus of claim 12, wherein said control part controls whether to output the melodies based on ON/OFF setting performed by operation through the operation part.

16. The communication apparatus of claim 12, further comprising:

volume adjusting means for adjusting an output volume of a melody through a speaker, wherein the control part causes the volume adjusting means to adjust the output volume of the melody output through the speaker.

17. The communication apparatus of claim 12, further comprising an LED control part which stores information regarding a plurality of light-emitting patterns of a lighting color and light-emitting timing of a light-emitting element which emits a light in a plurality of colors so as to control the lighting color and the light-emitting timing of the light-emitting element, wherein the specific party discrimination part stores for each of the specific parties respective illumination information, the illumination information for a specific party indicating one of the light emitting patterns stored in the LED control part, and when the party information which the receiving part received matches the specific party information stored for a matched specific party in the specific party discrimination part, the LED control part causes the light-emitting element to emit a light according to one of the light-emitting patterns corresponding to the matched specific party information.

18. The communication apparatus of claim 12, further comprising a silent-call-reception control part which adjusts, at a timing of outputting a melody, an output volume level of the output melody to an output volume level corresponding to a time zone of the communication apparatus.

* * * * *